July 14, 1931.  J. WILLIAMS  1,814,355
PISTON AND RING ASSEMBLY
Filed Dec. 3, 1927
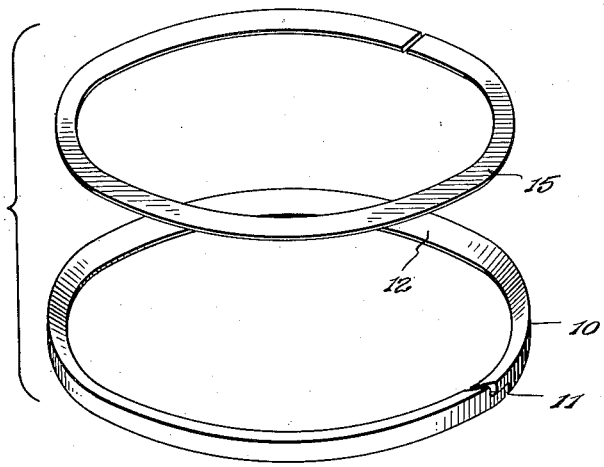
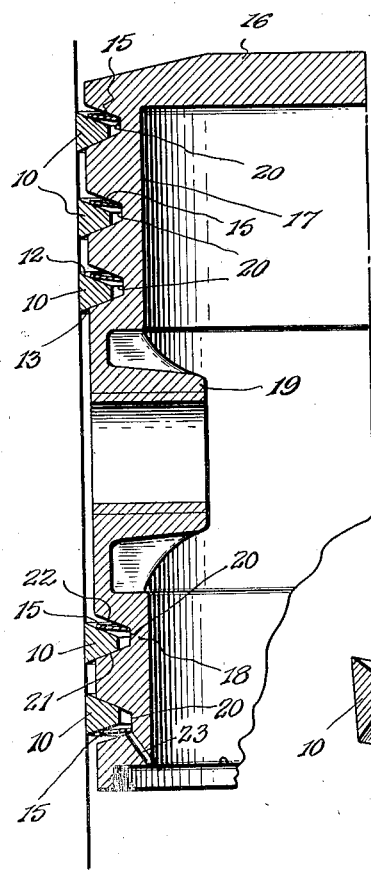
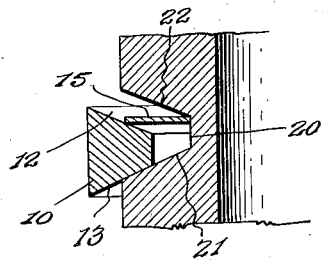
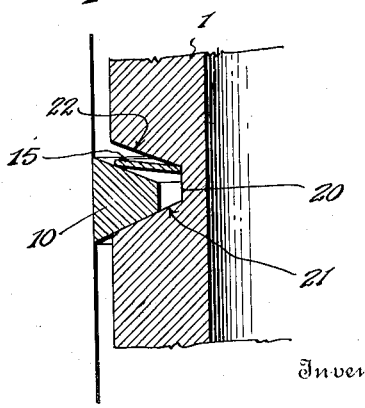
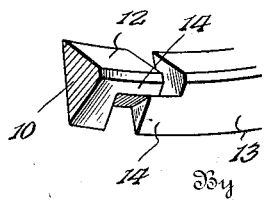
Inventor
Judson Williams.
By Lacey & Lacey, Attorneys Patented July 14, 1931

1,814,355

UNITED STATES PATENT OFFICE

JUDSON WILLIAMS, OF PHILADELPHIA, PENNSYLVANIA

PISTON AND RING ASSEMBLY

Application filed December 3, 1927. Serial No. 237,452.

This invention relates to an improved piston and ring assembly and seeks, among other objects to provide an assembly wherein the piston will, to all intents and purposes, be rigidly centered within the cylinder and supported with respect thereto without frictionally contacting the cylinder wall.

A further object of the invention is to provide an assembly wherein the centering and supporting of the piston will be accomplished through the medium of the rings and wherein a novel means will be provided for radially tensioning the rings.

And the invention seeks, as a still further object, to provide an assembly wherein, as compared with the use of ordinary rings, mechanical friction will be materially reduced.

Other objects of the invention not specifically mentioned in the foregoing will appear during the course of the following description.

In the drawings,

Figure 1 is a perspective view showing a typically ring member and tensioning element, Figure 2 is a fragmentary perspective view showing the joint between the ends of the ring member, Figure 3 is a fragmentary vertical sectional view showing a portion of the piston and ring assembly, Figure 4 is a detail sectional view showing the position of a typical ring member as initially installed in a typical ring groove and also illustrating the normal shape and position of a typical tensioning element, and Figure 5 is a detail sectional view similar to Figure 4 and showing the position of the ring member as well as the shape assumed by the tensioning element after the piston is disposed in a cylinder.

In carrying the invention into effect I employ a split resilient ring member 10 which may be provided at its ends with an approved joint such as a lap joint, as indicated at 11. As brought out in Figure 2 the ring is substantially V-shaped in cross-section and is provided with upper and lower beveled faces 12 and 13 respectively. As further brought out in this figure of the drawings, the lower beveled face 13 of said member extends across the tongues of the joint 11 to provide beveled lands 14 at the joint conforming to the inclination of said beveled face. I further employ a split annular tensioning element or ring 15. This element is flat and formed of cast iron so as to effectually withstand the thermal working conditions of an engine piston.

The present invention further comprehends a piston which, as shown in Figure 3, includes a head 16, trunk 17, and skirt 18, the piston being provided with alined wrist pin bearings one of which is shown at 19. Encircling the wall of the piston above and below the plane of the wrist pin bearings are substantially V-shaped ring grooves 20 having lower beveled faces 21 sloping downwardly to the periphery of the piston and upper beveled faces 22 sloping upwardly to the periphery of the piston. In the present instance I have shown three of the ring grooves above the wrist pin bearings and two of the grooves below the bearings in the skirt 18, the lowermost of the latter grooves being provided with a series of drain passages one of which is shown at 23. As brought out in Figure 3 one of the ring members 10 and one of the tensioning elements 15 is disposed in each of the ring grooves. The tensioning elements are, with the exception of the lowermost ring member, disposed above said ring members. In the instance of the lowermost ring member, the tensioning element is disposed below such member so that this lowermost ring member will provide an oil wipe. The engaging inclined walls of the piston and ring members are, of course, inclined to coact with each other.

The ring members 10 may, if desired, possess outward radial tension to bear against the cylinder wall. However, as brought out in Figure 4, said members, as initially installed, fit loosely in the ring grooves and preferably are substantially inert. In other words, the ring members have little or no outward radial tension. Furthermore, as also brought out in Figure 4, the tensioning elements 15, as initially installed, lie flat in the ring grooves, the inner edges of said elements hugging the bottom walls of said grooves and the outer edges of said elements resting upon the ring members.

When the piston is inserted in a cylinder, as shown in Figures 3 and 5 of the drawings, the ring members are contracted by the cylinder wall with the result that said members are caused to ride up the coacting inclined faces of the ring grooves. This contractive or inward radial movement of the ring members tends to contract the tensioning elements 15 with the result that the inner edges of said elements are forced and held against the bottom walls of the ring grooves at the adjacent corners thereof, while the confronting inclined faces of the ring members, in being advanced relative to the outer edge portions of said elements, tend to cant the elements to assume a frusto-conical shape. In other words, contractive movement of the ring members stresses the tensioning elements to tend to assume a frusto-conical shape, the confronting inclined faces above and below said elements providing clearance for the stressing thereof. The elements are thus brought under tension to constantly press downwardly on the ring members.

As will now be perceived the pressure of the tensioning elements on the ring members will cause the abutting inclined faces of the ring grooves and said members to coact for expanding said members against the cylinder wall, the cylinder wall being indicated by each of the vertical lines in Figures 3 and 5 respectively, and since the ring members, as initially installed, are substantially inert, as previously described, said members will be expanded radially substantially equally in all directions. The piston will thus be accurately centered within the cylinder. However, since a portion of the pressure of the tensioning elements on the ring members will be communicated directly to the inclined ring groove walls seating said members, the outward radial tension of the ring members against the cylinder wall will be correspondingly reduced with the result that, as compared with the use of ordinary radially expansive piston rings, mechanical friction is greatly lessened.

Attention is now directed to the fact that any force tending to cant or rock the piston must overcome the tension of the elements 15, and since a large portion of such force will be communicated through the abutting inclined walls of the ring grooves and the ring members directly to the cylinder wall, the tension of said elements will be amply sufficient to resist the remaining component of such force and hold the piston against canting movement. The piston will thus be firmly supported in centered position within the cylinder, the piston to all intents and purposes, being rigidly held against canting movement. The three rings above the wrist pin bearings 19 will, of course, firmly center the piston and support the piston near its upper end with respect to the cylinder wall while the two rings of the skirt will firmly center and support the piston near its lower end with respect to the cylinder wall. Canting of the piston will thus be effectually precluded. Since the lands 14 at the joints between the ends of the ring members will at all times seat flat against the coacting inclined walls of the ring grooves, said lands will form a seal at each of said joints so that compression cannot enter behind the ring members and leak past the joints. Preferably, the piston is undersize so that the clearance between the piston and cylinder wall will be more than sufficient to accommodate the maximum thermal expansion of the piston under working conditions thereof. The piston will, therefore, at no time frictionally contact the cylinder wall.

Having thus described the invention, what I claim is:

1. An assembly of the character described including a piston having a ring groove provided with a beveled side wall, a piston ring disposed in said groove and having an annular beveled face to coact with the beveled wall of the groove, and tensioning means in said groove between the piston ring and other side wall of the groove normally substantially flat and held under tension by said ring for pressing the ring when the ring is pressed inwardly towards the beveled wall of said groove and urging the piston ring outwardly.

2. An assembly of the character described including a piston having a ring groove substantially V-shaped in cross section to provide diverging side walls, a substantially V-shaped piston ring disposed in said groove, and an annular tensioning ring in the groove between the piston ring and one side wall of the groove normally substantially flat and stressed when the piston ring is forced inwardly to be held under tension thereby for pressing the piston ring towards the other wall of said groove and expanding the piston ring.

3. The combination with a piston having an annular groove therein, of a piston ring engaged therein, an expanding tensioning ring engaged in the groove between the piston ring and a side wall of the groove and having its inner periphery engaged with the inner wall of the groove and its outer periphery engaged with the ring, pressure exerted when forcing the piston ring inwardly causing the tensioning ring to assume a frusto-conical shape.

4. The combination with a piston having an annular groove therein formed with a beveled lower side wall, of a piston ring having beveled upper and lower faces received in said groove, a normally flat tensioning ring engaged in the groove between the piston ring and upper wall of the groove and having its inner periphery engaged with the inner wall of the groove at the juncture of the said inner wall with the upper wall of the groove, the outer periphery of the tensioning ring being engaged upon the upper face of the piston ring to hold the lower face thereof tightly engaged with the lower wall of the groove and cause the tensioning ring to assume a frusto-conical shape when the piston ring is contracted in the groove.

5. The combination with a piston ring of a thin flat follower ring supported concentrically upon the piston ring with the inner circumferential edge disposed to project inwardly beyond the inner circumferential wall of the piston ring whereby pressure exerted upon said inner circumferential edge deforms the follower ring to cup shape to exert pressure upon said piston ring.

6. A piston ring and follower assembly comprising a piston ring having a face inclined toward the center of the ring, and a thin flat follower ring concentrically disposed on said piston ring and supported at the outer circumferential edge upon said inclined face, said follower ring having the inner circumferential edge disposed to project inwardly from the inner circumferential wall of the piston ring whereby pressure exerted upon said inner circumferential edge deforms the follower ring to cup shape to exert pressure upon said piston ring.

In testimony whereof I affix my signature.

JUDSON WILLIAMS. [L. S.]